United States Patent [19]
Walz et al.

[11] 3,781,061
[45] Dec. 25, 1973

[54] SAFETY DEVICE FOR A VEHICLE SEAT

[75] Inventors: Jurgen Walz; Eberhard Faust, both of Stuttgart, Germany

[73] Assignee: Recaro GmbH & Co., Stuttgart, Germany

[22] Filed: Aug. 16, 1972

[21] Appl. No.: 281,047

[30] Foreign Application Priority Data
Aug. 21, 1971 Germany.................. P 21 42 020.2

[52] U.S. Cl............. 297/388, 180/82, 280/150 SB, 297/390
[51] Int. Cl...................... A62b 35/00, B60r 21/10
[58] Field of Search.................. 297/385, 388, 390; 180/82; 280/150 SB; 242/107 SB

[56] References Cited
UNITED STATES PATENTS
3,300,910 1/1967 Isaac................................. 297/388
3,343,623 9/1967 Porter................................ 297/388
3,613,819 10/1971 Maloney......................... 297/388 X
3,653,714 4/1972 Gentile............................ 297/388 X Primary Examiner—Casmir A. Nunberg
Attorney—Ernest G. Montague

[57] ABSTRACT

A safety belt arrangement for a vehicle seat to automatically position the seat belt around the seat occupant as soon as he is seated. One or several driven elongated carriers draw the seat belt into its interlocking position, are released for return to their starting positions as the latch mechanism is closed and are automatically reconnected to the component latch parts when the latch mechanism is unlocked. The operation sequence is activated by a switch in the seat cushion responding to pressure in excess of a given value. Structural details permit mounting the arrangement after car assembly and keep the device and the seat belt straps out of sight when not in use.

33 Claims, 4 Drawing Figures

SAFETY DEVICE FOR A VEHICLE SEAT

BACKGROUND OF THE INVENTION

1. Field of the Invention

The present invention relates to a safety device for a vehicle seat, in particular a seat belt with a latch mechanism and an arrangement for automatically positioning the safety belt around the seat occupant using a driven, elongated carrier attached to the one component part of the latch mechanism and directed in a predetermined path.

2. Description of the Prior Art

When using conventional seat belts, the seat occupant determines whether or not to fasten his seat belt. Frequently, he fails to fasten his safety belt merely for reasons of inconvenience.

Considerations to ensure that an existing safety belt is used, resulted in various proposals. One suggestion calls for fastening the upper end of an across-the-shoulder seat belt to a carrier of an arrangement for automatically positioning the safety belt around the seat occupant, wherein that carrier can be moved back and forth along a path starting from a point in the vehicle roof in front of the seat occupant and passing behind said seat occupant and then moving down the side wall of the vehicle. The starting point for the predetermined path of a carrier for an occupant of a front seat thus would be next to the upper corner of the wind shield. The across-the-shoulder safety belt would extend from that same starting point diagonally downward to the back of the vehicle and into a position between the two front seats to permit fastening the latch mechanism. After the seat occupant sits down, the carrier directs the seat belt along its predetermined path, first toward the back and then downward, at the same time placing the belt strap around the upper part of the seat occupant's body. Disadvantageous is not alone the fact that it is practically impossible to use this arrangement for positioning a three-point-safety belt around a seat occupant. Serious drawbacks are also the considerable costs and cogent difficulties encountered in subsequently mounting the device after car assembly. Furthermore, the visual impression of seat belts hanging diagonally across the interior of the car when not in use, is annoying.

It is the purpose of the present invention to obviate the aforementioned difficulties by providing an arrangement for positioning a safety belt around the seat occupant which is not restricted to the use of an across-the-shoulder belt, is simple in structure and is not conspicuously present when not in use.

SUMMARY

The preferred embodiment of the present invention is described with reference to an arrangement for positioning the safety belt around the occupant of a vehicle seat. However, it is to be understood that the invention is equally applicable to a broad variety of arrangements, wherein a guide means is provided with at least one elongated carrier automatically moveable along a predetermined path and extending beyond the guide means to encircle the seat occupant and close the latch mechanism.

The arrangement for positioning the seat belt according to the invention may be located either within the vehicle seat, or at the edge of the seat, or close to the seat.

The preferred embodiment of the invention employs an elongated carrier to direct one of the component parts of the latch mechanism with its attached seat belt strap to a position where both component latch parts interlock and the carrier is automatically released for return to its starting position. Accordingly, the carrier is visible only during the process of positioning the safety belt around the seat occupant. When the latch mechanism is opened, the carrier is automatically reconnected to its respective component latch part, thus ensuring that each component part of the latch mechanism attached to a seat belt strap will be automatically brought to its interlocking position when the operation sequence is repeated.

The predetermined path for the carrier lies in the same plane as provided by a two-point seat belt, whereby the carrier might also be attached to the lower end of an across-the-shoulder strap in addition to being secured to a strap of a two-point seat belt. The carrier might also be directed along the path taken by an across-the-shoulder belt.

In order to keep the length of the elongated carrier to a minimum, one preferred embodiment of the invention calls for a second carrier connected to a second latch component and attached to at least one strap of the safety belt. This second carrier has the same elongated shape as the first carrier and is free for reciprocal movement with respect to its guide means located on the opposite side of the seat from the first carrier. The connection between the second carrier and the second component part of the latch mechanism is established in a fashion similar to the connection between the first carrier and the first component part of the latch mechanism to permit the second carrier to separate from its associated latch component as soon as the latch mechanism is closed and to automatically reestablish that connection when the latch mechanism is unlocked. Each of the two carriers needs to travel only part of the path required by a single carrier to position the safety belt around the seat occupant. This considerably reduces the demands placed on directing the path of the carriers and on their stiffness, to greatly minimize space requirements as well. It is readily apparent that use of more than two carriers is possible. Nevertheless, the necessary additional structural details will make such solution feasible only in exceptional cases, e.g. a four-point seat belt.

Particularly advantageous because of its simplicity is a carrier that has the shape of a curved rail. A rail also simplifies following the predetermined path. Simple to construct is also another version, wherein the carrier is shaped as a rod or rail and its one end is located next to the seat, permitting movement about a vertical axis of rotation. The carrier can thus be swung from a resting position endwise to pass in front of and to the other side of the seat occupant to permit closing the latch mechanism. Irrespective of the path taken by the carrier, it might be quite advantageous to have the carrier lengthened or shortened in telescope fashion. The carrier then would take up little space while in its starting position, necessitating only a single carrier in most instances. The telescope mechanism for such carrier could be operated by customary means, e.g. hydraulically.

To ensure that the seat belt straps cannot become tangled while not in use and also are not conspicuously visible, the invention provides for an arrangement to automatically wind up the belt straps when the latch mechanism is unlocked. This arrangement is driven to continuously provide a torque to wind up the belt strap. This serves not only as a simple means to transport the latch components to their starting positions when the latch mechanism is unlocked. Once the carrier has separated from its component latch part, the continuing torque tightens the safety belt around the seat occupant by taking up any existing slack. Of course, the take-up rolls must be provided with a lock to prevent the belt straps from being stripped off the rolls in the event of an accident. This might be accomplished with an automatically controlled clutch.

In the preferred form of the invention, the carrier is connected to its corresponding component part of the latch mechanism by means of a plug connection. If a matching socket is provided in the latch component, it is possible to readily separate the carrier from its latch component by pulling the carrier until its plug is released by the socket in the latch component. Such plug and socket arrangement readily enables reconnecting the carrier to its respective component part of the latch mechanism after the latch is unlocked and its component parts return to their starting position. The guide means could be adapted to direct the plug of the carrier into the socket of the latch component as the latch parts are pulled into the guide means when the belt straps are being wound up.

To ensure that the seat belt is automatically positioned around the seat occupant once he is seated, and at the same time to make certain that the person is not harmed if the single carrier or both carriers are activated before the person is properly seated, the driving mechanism for the carriers is provided with a safety clutch or a pressure sensitive switch to effect withdrawal of the carrier or the carriers to their starting positions, thus initiating repetition of the performance to position the safety belt around the seat occupant. A friction roll arrangement could serve as a safety clutch. Particularly suitable is the arrangement, wherein each carrier has at least one friction roll directly adjacent to that carrier and all friction rolls are jointly activated by a motor. This would keep requirements for the drive mechanism to a minimum.

The simplest solution to control the means propelling the carriers, consists of a switch that responds to pressure exerted on the vehicle seat in excess of a given value. Of course, it is possible to have other means trigger the operation to position a safety belt around the seat occupant, e.g. by starting the motor of the automobile. By providing a lock that would prevent operating the ignition until the seat belt has been fastened, one could ensure that the seat occupant could not drive the automobile away until after the seat belt was properly locked.

Different systems might be used to reverse the transport direction of the single carrier or of several carriers once the latch mechanism is closed, and also to shut down the motor. It would be possible to provide each of the component parts of the latch mechanism with a contact element for reversing the transport direction and with a pressure sensitive switch to shut down the motor.

It is advisable to have a casing to cover at least the carrier or carriers when in their starting positions, preferably also the guide means, the adapting guide surfaces, and the take-up rolls. This casing is curved and fastened to the back of the seat frame with its two ends located each on one side of the seat. The guide means for the carriers, which may project from the casing, are placed so as not to substantially extend above seat cushion height or protrude beyond the width of the back rest. The entire arrangement for positioning the safety belt around a seat occupant would then fit into the smallest amount of space possible and would not be conspicuously visible. For this arrangement it is practical to have the carrier or carriers move along a path lying in a plane that tilts forward, and to have that path ascend toward the middle.

It is therefore an object of the present invention to provide an arrangement for positioning a safety belt around a seat occupant, wherein the carrier is directed along a predetermined path similar to that being occupied by one or several straps of a safety belt when fastened around a seat occupant.

It is another object of the invention to provide an arrangement for positioning a safety belt that is simple in construction to facilitate subsequent mounting after car assembly and to obviate attachment to the carriage body.

It is still another object of the invention to provide an arrangement for positioning a seat belt, whereby neither the guide device itself nor the seat belt straps are conspicuously visible when the seat belt is not in use, nor are they disturbing to the seat occupant.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENTS

Now referring to the drawings, the invention is described with reference to a customary vehicle seat, comprising frame 1 and a seat cushion divided into a center area 2 and two projecting stuffed side cushions 3. Back rest 5 is attached to frame 1 by means of two hinge fittings 4, permitting the seat back to be moved and locked into position.

Figure 1:
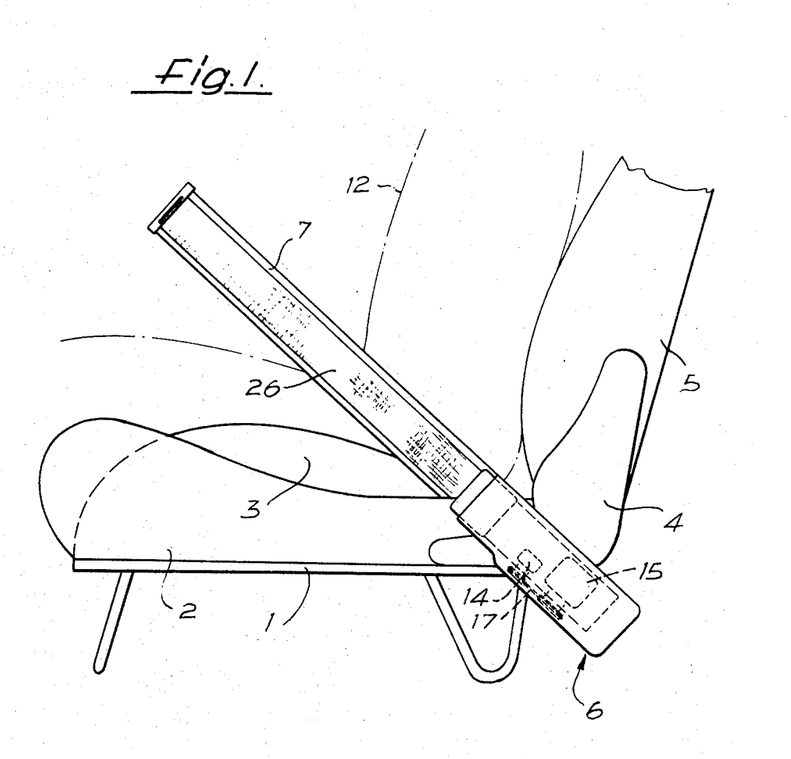
FIG. 1 is a side elevational view of a vehicle seat having an arrangement for positioning a safety belt around a seat occupant illustrating the preferred embodiment of the present invention.

To ensure that a seat occupant will atuomatically be fastened to his seat by a safety belt, illustrated in the preferred embodiment of FIG. 1 as a two-point seat belt, as soon as he sits down, an arrangement 6 for positioning a safety belt is employed, located behind frame 1.

Figure 2:
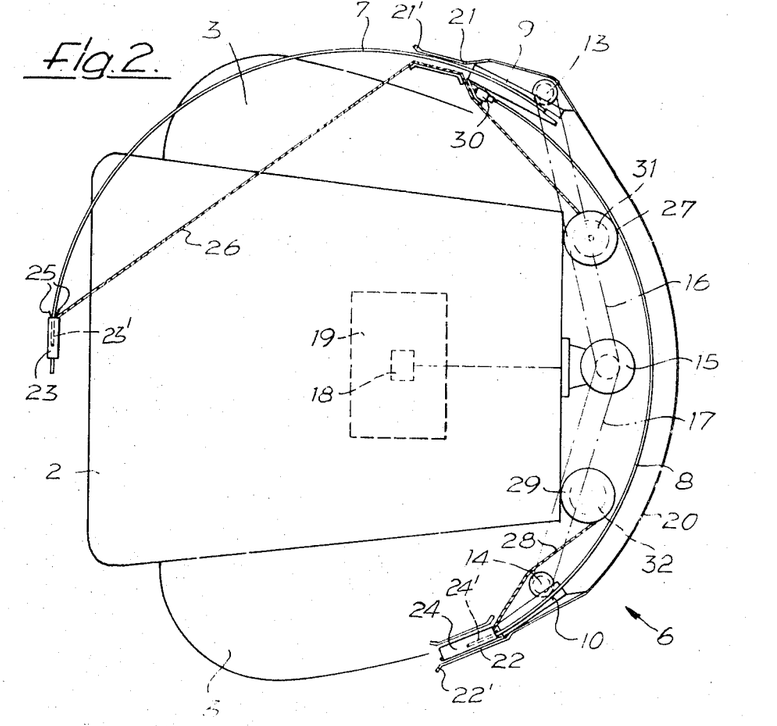
FIG. 2 is a plan view of a vehicle seat where the back has been removed to show the seat cushion of the vehicle seat and the operating parts of the preferred embodiment of the present invention.

As shown in FIG. 2, this arrangement has two carriers 7 and 8, each in the shape of a curved flat rail. The two flat rails are made of fiber glass reinforced plastic. It is also possible to use other materials, for example light weight metals. Each carrier 7 and 8 can be moved in a longitudinal direction through a guide means 9 resp. 10 located to the side and in back of the vehicle seat. FIG. 1 shows that both guide means are positioned to be in a plane tilted and raised toward the front. The inclination of this plane and the radius of curvature of the two carriers 7 and 8 are chosen to permit the two carriers to encircle the body of the seat occupant, shown in FIG. 1 as a dotted line 12, with enough room to spare as the carriers move around the hips and stomach.

Carrier 7 is driven by friction roll 13 located as part of guide means 9 adjacent to the outside surface of the carrier; carrier 8 is driven by friction roll 14 located as part of guide means 10 adjacent to the inside surface of the carrier. Friction rolls 13 and 14 are jointly activated by a single motor 15, located in a suitable position, e.g. in the center and behind the seat as illustrated in FIG. 2. Continuous belt drives 16 and 17 couple the motor 15 with each of friction rolls 13 and 14.

A switch 18 controls the motor 15. However, switch 18 closes the circuit only if the pressure exerted on center area 2 of the seat cushion exceeds a minimum value. A pressure plate 19 located on the bottom surface of the seat cushion transfers the pressure exerted on the seat to switch 18, even if the stress is distributed unevenly affecting only half of the center area.

The position of carrier 8 as shown in FIG. 2 illustrates the location of carriers 7 and 8 when the seat is not in use. Both carriers curve around the back of the seat in this starting position. A U-shaped casing 20 is curved to fit and cover the carriers on three sides when the carriers are in their starting positions, leaving the side closest to the seat open. The casing also covers the guide means 9 and 10, in addition to the friction rolls 13 and 14, as shown in FIG. 1.

Also covered by casing 20 are two guide surfaces 21 and 22 at the entrance to the guide means 9 and 10. The guide surfaces 21 and 22 serve to hold the respective component latch parts 23 and 24 of the latch mechanism of the safety belt as long as the safety belt is not in use. Both component latch parts 23 and 24 are provided with a socket respectively 23' and 24' sufficiently deep to match and to firmly adhere to the leading end of the carrier. The guide surfaces 21 and 22 are shaped such that component latch parts 23 and 24 of the latch mechanism are mechanically plugged into the carriers 7 and 8 as the component latch parts are pulled into the guide surfaces 21 and 22. This is accomplished by providing the guide surfaces 21 and 22 each with a funnel-shaped receiving end 21' and 22' to ease positioning the respective component latch parts in the guide surfaces. Similarly, funnel-shaped lips 25 ease positioning the leading end of carriers 7 and 8 into the socket slots of component latch parts 23 and 24.

The component latch part 23 of the two-point seat belt illustrated, is attached to one end of a first belt strap 26 which is fed through guide surface 21 as shown in FIG. 2. The second end of strap 26 is connected to a take-up roll 27 located behind the seat and covered by the casing 20. A continuous torque to wind up the belt strap is provided for the take-up roll 27 by a spring not illustrated in the drawing.

In analogous fashion, the one end of a second belt strap 28 is attached to the second latch component 24. The second end of strap 28 is attached to a take-up roll 29, of similar shape as the take-up roll 27 and symmetrically positioned thereto. Belt strap 28 is drawn through guide surface 22, when the second component latch part 24 is moved away from its position inside guide surface 22.

Take-up rolls 27 and 29 are each connected to a braking shock absorber 31 resp. 32 by means of an automatically controlled clutch which is activated when the belt strap is abruptly pulled off. It is also possible to have the braking action of the shock absorber carried out by different, known means to absorb abrupt changes in the stress exerted on the belt strap or to prevent the stress exerted on the belt strap from exceeding a predetermined value.

After the switch 18 is closed, both carriers 7 and 8 are moved out of their starting positions, shown in the drawings only for carrier 8, by the action of the friction rolls 13 and 14 and brought to a latch interlocking position shown in the drawings for carrier 7. This movement of the carriers also propels the attached respective component latch parts 23 and 24 and unwinds the belt straps 26 and 28 from their respective take-up rolls. In their locking position carriers 7 and 8 encircle the body of the seat occupant to join the first component latch part 23 to the second component latch part 24 at the place shown in FIG. 2 for part 23.

When interlocked, component latch parts 23 and 24 close an electric circuit. Each of the two carriers contains a lead, the one end of which is connected to the respective component latch part, the other end of which closes the circuit when contacted by the respective guide means. If the carrier is made of metal, a lead is not necessary. Closing the circuit reverses the direction of rotation of the motor 15. The reversing switch is not illustrated. Reversing the motor 15 reverses the transport direction of carriers 7 and 8 to return them to their starting positions. This movement pulls the leading end of the carrier out of the socket of the respective component latch part. Disengaging the carriers from the component latch parts activates the take-up rolls 27 and 29 to automatically place the seat belt around the seat occupant by taking up the slack of the belt straps.

A pressure sensitive switch 30 is activated by carrier 8 to shut down the motor 15 as soon as the carriers have reached their starting positions. It is also possible to provide a pressure sensitive switch coupled to both carrier 7 and carrier 8 and which would be activated only after both carriers have reached their starting positions.

The belt straps 26 and 28 are automatically wound up as soon as the latch mechanism is unlocked. In this operation, component latch part 23 is pulled into guide surface 21 and thus reconnected to the waiting leading end of carrier 7; latch part 24 moves into guide surface 22 to engage the waiting leading end of carrier 8. The arrangement for automatically positioning a safety belt around a seat occupant is then ready for a repeated performance. If the seat occupant has not left the seat in the meantime, switch 18 will automatically turn on motor 15 to repeat the operation of fastening the seat belt.

Figure 3:
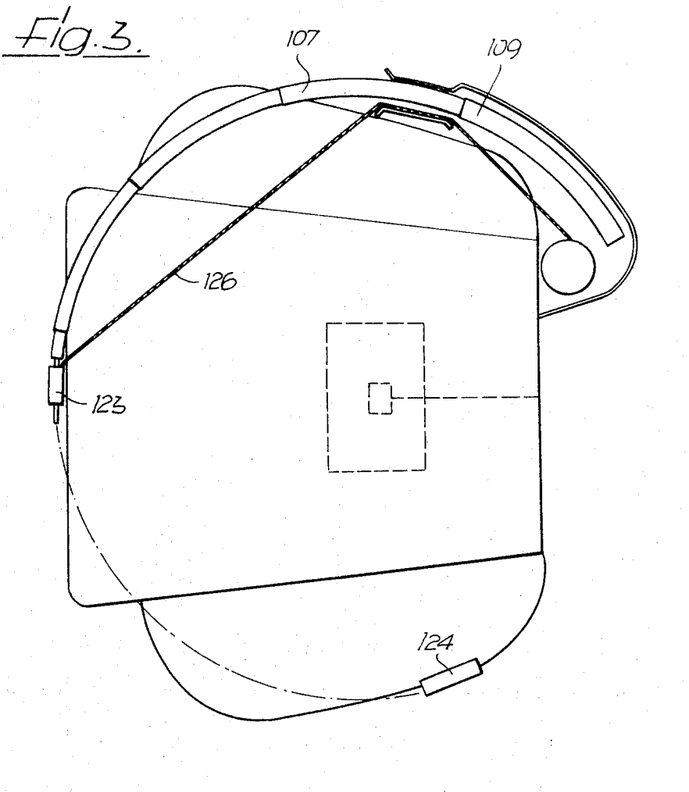
FIG. 3 is a plan view similar to FIG. 2 illustrating operation of a single telescoping curved-rail carrier.

The embodiment illustrated in FIG. 3 employs only a single carrier 107, a telescopic tube in which the intermeshing parts all have the same curvature. That part of carrier 107 having the largest diameter serves as supporting guide means 109 located to the side and adjacent to the seat and attached to the seat frame. Guide means 109 could also be attached to the carriage body. the maximum length of the carrier 107 is chosen to permit its free end when connected with the component latch part 123 to direct latch part 123 along a path in front of and to the side of the seat occupant, to interlock the part 123 with the component latch part 124 attached to the opposite side of the seat. In this operation, the belt strap 126 is attached to the latch part 123 and is fitted around the seated person as part 123 is moved to the locking position.

Carrier 107 can be lengthened or shortened by hydraulic means no represented in the drawing, or by a different drive mechanism. The drive mechanism is controlled essentially in the same manner as described in connection with FIG. 1 and FIG. 2. It would also be possible to use two carriers, one on each side of the seat.

Figure 4:
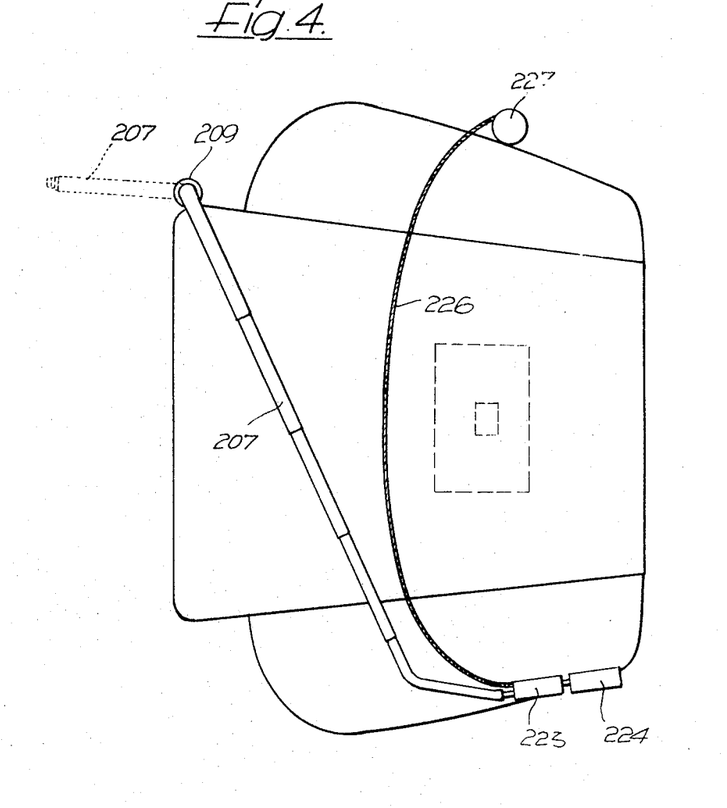
FIG. 4 is a plan view similar to FIG. 2 illustrating a single telescoping rod or tube carrier positioned to the front and side of the seat.

FIG. 4 represents an embodiment of the invention wherein the carrier 207 is a stiff bracket, its one end positioned to the side and at the front edge of the seat in guide means 209, which permits movement about a vertical axis of rotation. The guide means 209 is fastened to the seat frame; it might also be fastened to the carriage body. Carrier 207 is sufficiently long and of a shape to permit directing its free end affixed to component latch part 223 to a locking position with the second component latch part 224; part 224 is located at the opposite side and next to the seat in customary fashion.

A drive mechanism, e.g. an electric or a hydraulic motor, moves the carrier 207 from a starting position pointing in the longitudinal direction of the vehicle and represented in FIG. 4 by dotted lines, through a path which runs diagonally across the lap of the seat occupant to an interlocking position shown by solid lines.

The movement of carrier 207 positions the seat belt strap 226 attached to the latch part 223 around the seat occupant. The take-up roll 227 is built similar to take-up roll 27 of FIG. 2 and serves to take up the slack of the belt strap 226 once it is placed around the seat occupant and it also permits adjusting the length of strap 226 as carrier 207 is rotated about its axis.

The drive mechanism to transport the carrier 207 is controlled by means similar to the arrangement described for the preferred embodiment of FIG. 2. Details thereof are thus omitted here.

It is also possible for the carrier 207 to be fashioned as a telescopic rod or tube. This would have the advantage that the carrier would occupy very little space in its starting position.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. Safety device for a vehicle seat comprising
a seat frame,
a safety belt including a belt strap and having a latch mechanism having two interlockable component parts and means for positioning said safety belt around the seat occupant,
said means including a guide means with at least one elongated carrier, movable in part through said guide means and adapted to move along a predetermined path extending beyond the guide means to pass in front of the seat occupant,
said carrier having a curved, at least substantially shape-retaining rail form,
means for reciprocal movement of said carrier with respect to said guide means, one end of said carrier being releasably connected to one part of said latch mechanism during movement of said carrier in a direction to interlock the two component parts of said latch mechanism and released from said latch mechanism during movement of said carrier in a direction for return of said carrier to its starting position when said latch mechanism is closed.

2. The device as defined in claim 1, wherein said predetermined path of said movable carrier lies in the same plane as the path prescribed for a two-point seat belt.

3. The device as defined in claim 1, which includes a seat cushion and a back rest and wherein said guide means for said carrier does not extend substantially above the height of said seat cushion or protrude beyond the width of said back rest.

4. The device as defined in claim 1, wherein said elongated carrier is a substantially stiff and rotatable arm which arm extends in the longitudinal direction of the vehicle and swings in front of the seat occupant to a position in which its free end is placed at his side to close said latch mechanism.

5. The devide as defined in claim 1, further comprising means for taking up said belt strap upon unlocking said latch mechanism.

6. The device as defined in claim 5, wherein said means includes a drive to continuously provide a torque to wind up said belt strap.

7. The device as defined in claim 1, wherein said carrier is connected to the one end of said interlocking latch component part by means of a plug connection.

8. The device as defined in claim 1, wherein said guide means is designed to automatically direct a plug connection of said carrier into a socket of said component part of said latch mechanism upon taking up almost completely said belt strap.

9. The device as defined in claim 1, wherein said means for moving said carrier includes means for continuous advancement of said carrier.

10. The device as defined in claim 9, wherein said means for continuous advancement comprises a friction roll.

11. The device as defined in claim 9, wherein said means for continuous advancement of said carrier is rendered inoperative upon blocking its predetermined path and upon closing said latch mechanism, respectively.

12. The device as defined in claim 1, wherein said means for moving said carrier comprises at least one friction roll directly adjacent to said carrier, and a motor operating said at least one friction roll.

13. The device as defined in claim 3, which includes a switch activating said means for positioning said safety belt, and said switch is responding to pressure in excess of a given value upon exerting said pressure on said seat cushion.

14. The device as defined in claim 12, wherein each of said interlocking component parts of said latch mechanism has a contact element to reverse the transport direction of said means for moving said carrier upon closing said latch mechanism, and a pressure sensitive switch for shutting down said motor upon returning said carrier to its starting position.

15. The device, as set forth in claim 1, further comprising a casing for said carrier when in its starting position, for said guide means and for said means for winding up said seat belt straps.

16. The device as defined in claim 15, wherein said casing is curved and fastened to the back of said seat frame having two ends, and each of said two ends are located on one side of said seat frame.

17. The device as defined in claim 1, which includes at least one shock absorber connected to said safety belt and activated upon exceeding a prescribed value for traction of said seat belt.

18. The safety device as defined in claim 1, wherein said means for positioning said safety belt has a second elongated carrier and said latch mechanism has a second component part attached to at least one strap of the safety belt, said second carrier being of similar shape and rigidity as said first carrier, movable in part through a guide means on the opposite side of said seat, the one end of said second carrier being connected to the second part of said latch mechanism during movement of said second carrier to join the two component parts of said latch mechanism and released for return to its starting position upon closing said latch mechanism.

19. The device as defined in claim 18, wherein said predetermined path of said movable carriers lies in the same plane as the path prescribed for a two-point seat belt.

20. The device as defined in claim 18, wherein said guide means for each of said carriers does not extend substantially above the height of said seat cushion or protrude beyond the width of said back rest.

21. The device as defined in claim 18, further comprising means for taking up each of said belt straps upon unlocking said latch mechanism.

22. The device as defined in claim 21, wherein said means includes a drive for continuously providing a torque to wind up said belt straps.

23. The device, as defined in claim 18, wherein each of said carriers is connected to one of said ends of said interlocking latch components by means of a plug connection.

24. The device as defined in claim 18, wherein each of said guide means is designed for automatically directing a plug connection of one of said carriers into a socket of said component part of said latch mechanism upon almost completely taking up said belt straps.

25. The device as defined in claim 18, wherein said means for movement of said carriers includes means for continuous advancement of said carriers.

26. The device as defined in claim 25, wherein said means for continuous advancement comprises friction rolls.

27. The device as defined in claim 25, wherein said means for continuous advancement of said carriers is rendered inoperative upon blocking their predetermined path and upon closing said latch mechanism, respectively.

28. The device as defined in claim 25, wherein said means for movement of said carriers comprises at least one friction roll directly adjacent to said carriers, and a motor operating at least said one friction roll.

29. The device as defined in claim 18, which includes a switch constituting said means for positioning said safety belt, and said switch responding to a pressure in excess of a given value upon exerting said pressure on said vehicle seat.

30. The device as defined in claim 18, wherein each of the said interlocking component parts of said latch mechanism is provided with a contact element to reverse the transport direction of said means moving said carriers upon closing said latch mechanism and with a pressure sensitive switch in order to shut down the motor upon returning all carriers to their starting positions.

31. The device as defined in claim 18, further comprising a casing for all said carriers when in their starting positions, for said guide means and for said means for winding up said seat belt straps.

32. The device as defined in claim 31, wherein said casing is curved and fastened to the back of said seat frame, each of two ends of the lathe are located each on one side of said seat frame.

33. The device as defined in claim 18, wherein said safety belt is connected to at least one shock absorber, and means for activating said shock absorber upon exceeding a prescribed value for the seat belt traction.

* * * * *

UNITED STATES PATENT OFFICE
CERTIFICATE OF CORRECTION

Patent No. 3,781,061  Dated December 25, 1973

Inventor(s) Jürgen Walz et al.

It is certified that error appears in the above-identified patent and that said Letters Patent are hereby corrected as shown below:

On the Cover Sheet, Item [75], the inventor's name "Jurgen Walz" should read -- Jürgen Walz --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks